US010718689B2

(12) United States Patent
Gandhi et al.

(10) Patent No.: US 10,718,689 B2
(45) Date of Patent: Jul. 21, 2020

(54) MODELING AND VISUALIZATION OF VIBRATION MECHANICS IN RESIDUAL SPACE

(71) Applicant: General Electric Company, Schenectady, NY (US)

(72) Inventors: Devang Jagdish Gandhi, Atlanta, GA (US); Christopher Schreiner, Lisle, IL (US); Donald Scott Doan, Houston, TX (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 15/388,698

(22) Filed: Dec. 22, 2016

(65) Prior Publication Data

US 2018/0180515 A1   Jun. 28, 2018

(51) Int. Cl.
*G01M 13/045* (2019.01)
*G01M 13/028* (2019.01)
(Continued)

(52) U.S. Cl.
CPC .......... *G01M 13/045* (2013.01); *G01H 1/003* (2013.01); *G01H 1/006* (2013.01);
(Continued)

(58) Field of Classification Search
CPC .. G01M 13/045; G01M 15/14; G01M 13/028; G01M 1/22; G01M 15/12; G05B 23/0283; G01H 1/006; G01H 1/003
(Continued)

(56) References Cited

U.S. PATENT DOCUMENTS 3,045,221 A   7/1962   Roop
4,435,770 A   3/1984   Shiohata et al.
(Continued)

FOREIGN PATENT DOCUMENTS

DE   40 32 299 A1   4/1992

OTHER PUBLICATIONS

Pennacchi et al. "Bivariate analysis of complex vibration data: An application to condition monitoring of rotating machinery." Elsevier Mechanical Systems and Signal Processing 20 (2006) 2340-2374. (Year: 2006).*
(Continued)

*Primary Examiner* — Saif A Alhija
(74) *Attorney, Agent, or Firm* — Eversheds Sutherland (US) LLP

(57) ABSTRACT

This disclosure relates to modeling and visualization of vibration mechanics in residual space, and includes systems and methods for vibrational analysis. In one embodiment, a method includes acquiring, by at least one sensor, vibrational data and an operational mode of rotating equipment. The method may then proceed with determining, by an equipment controller communicatively coupled to the sensor, at least one vibrational vector based on the vibrational data. The method may determine, by the equipment controller and based on a model, an expected vibrational vector for the operational mode. The method may calculate, by the equipment controller, a residual vector as a difference between the vibrational vector and the expected vector. The method may also determine, by the equipment controller, at least one abnormality associated with the rotating equipment based on the residual vector. The method may display a graph representing boundaries of a region of allotted residual vectors and a point representing the residual vector.

18 Claims, 13 Drawing Sheets

(51) Int. Cl.
G01M 1/22 (2006.01)
G01M 15/12 (2006.01)
G01M 15/14 (2006.01)
G01H 1/00 (2006.01)
G05B 23/02 (2006.01)

(52) U.S. Cl.
CPC ............ *G01M 1/22* (2013.01); *G01M 13/028* (2013.01); *G01M 15/12* (2013.01); *G01M 15/14* (2013.01); *G05B 23/0283* (2013.01)

(58) Field of Classification Search
USPC .......................................................... 703/6
See application file for complete search history.

(56) References Cited

U.S. PATENT DOCUMENTS

| | | | |
|---|---|---|---|
| RE31,750 E | 11/1984 | Morrow | |
| 4,639,882 A | 1/1987 | Keats | |
| 4,937,763 A | 6/1990 | Mott | |
| 5,109,700 A | 5/1992 | Hicho | |
| 5,610,339 A | 3/1997 | Haseley et al. | |
| 5,710,723 A | 1/1998 | Hoth et al. | |
| 5,764,509 A | 6/1998 | Gross et al. | |
| 5,774,379 A | 6/1998 | Gross et al. | |
| 5,842,157 A | 11/1998 | Wehhofer et al. | |
| 5,943,634 A | 8/1999 | Piety et al. | |
| 5,987,399 A | 11/1999 | Wegerich et al. | |
| 6,014,598 A | 1/2000 | Duyar et al. | |
| 6,021,991 A * | 2/2000 | Mayama | F16F 15/02 188/267 |
| 6,098,022 A | 8/2000 | Sonnichsen et al. | |
| 2004/0060347 A1 | 4/2004 | Comperat et al. | |
| 2005/0049827 A1* | 3/2005 | Yuan | G05B 9/02 702/179 |

OTHER PUBLICATIONS

Hong, Hanyu, and Tianxu Zhang. "Fast restoration approach for rotational motion blurred image based on deconvolution along the blurring paths." Optical Engineering 42.12 (2003): 3471-3487.*

Bognatz, Stanley R., "Transient Speed Vibration Analysis—Insights into Machinery Behavior," Vibration Piedmont Chapter Meeting, Dec. 7, 2007, Carbondale, PA, 34 pages.

Orbit, "A Technical Publication for Advancing the Practice of Operating Asset Condition Monitoring, Diagnostics, and Performance Optimization," vol. 32, No. 3, Jul. 2012, 15 pages.

Wegerich, Stephan, "Similarity Based Modeling of Vibration Features for Fault Detection and Identification," SmartSignal Corporation, Lisle, IL, 17 pages.

Extended European Search Report and Opinion issued in connection with corresponding EP Application No. 17209300.7 dated May 23, 2018.

Response to EP Search Report for EP 170209300.7, dated Apr. 8, 2019 (9 pp.).

Notice of Allowance of EP 170209300.7, dated Apr. 12, 2019 (48 pp.).

* cited by examiner

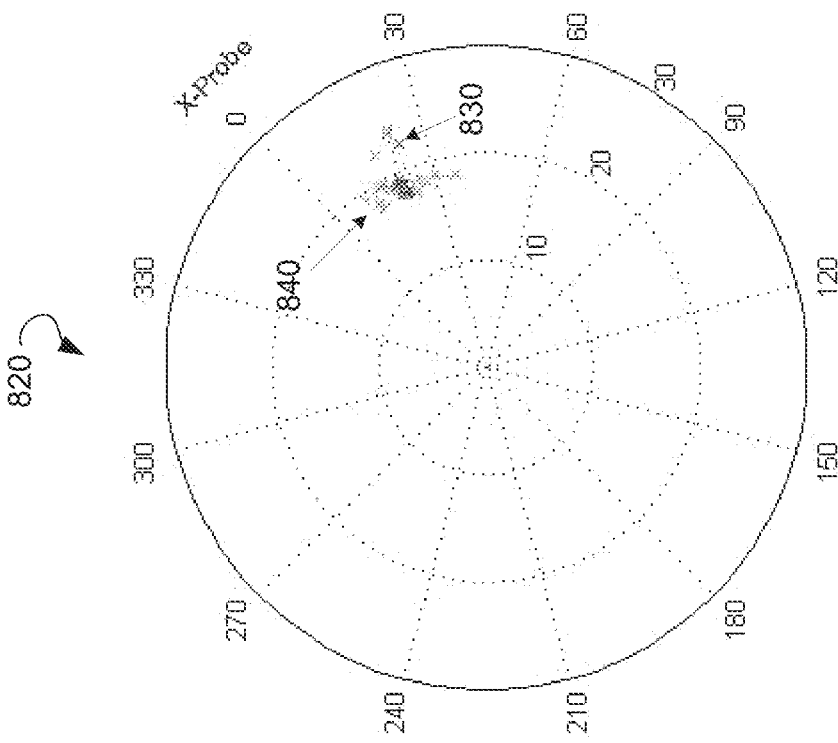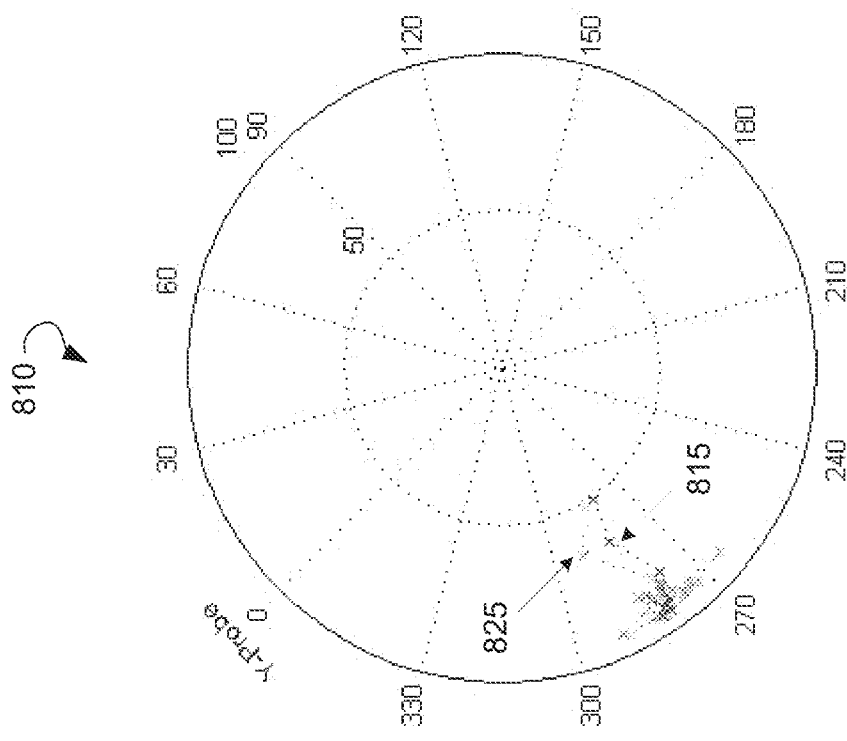
FIG. 8

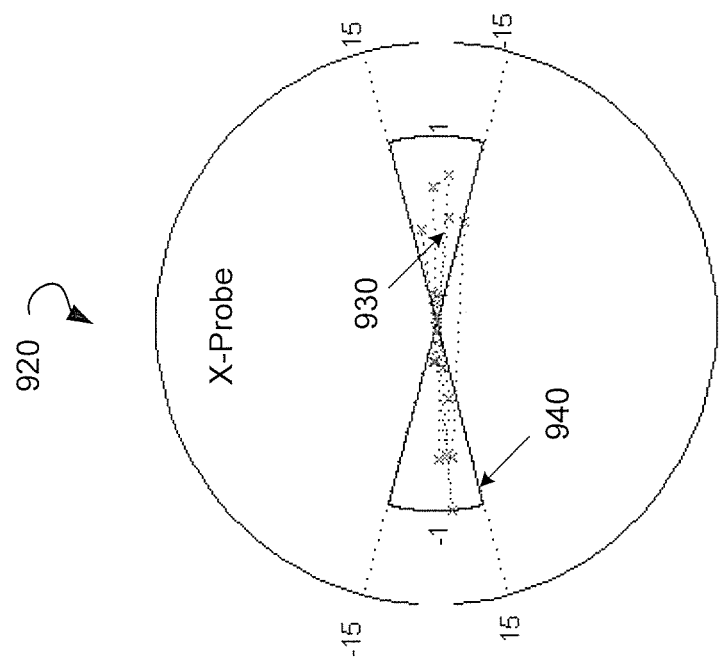
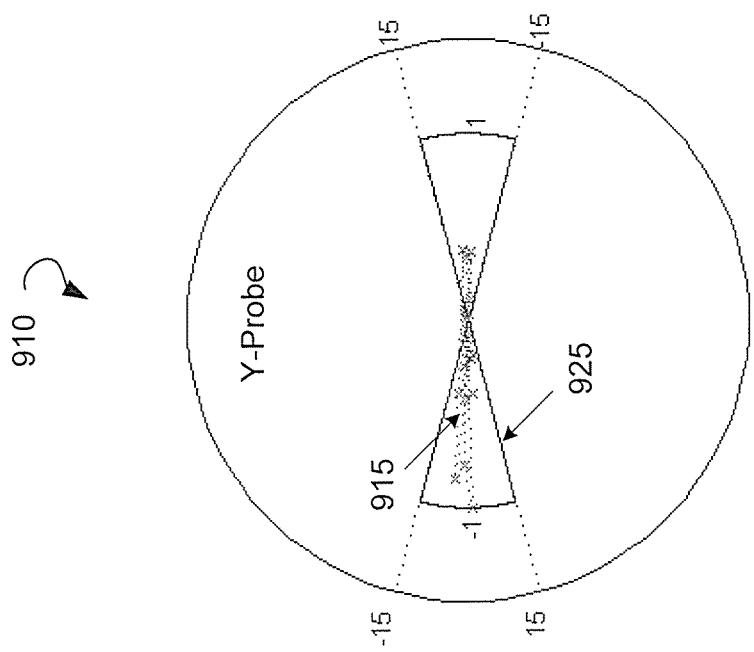
FIG. 9

```
                                                        ┌─ 1100
                                                        ▼

┌─────────────────────────────────────────────────────────────────────┐
│ Determine based on the model, by the equipment controller, a region │
│           of allotted residual vectors for the operational mode     │
│                                 1102                                │
└─────────────────────────────────────────────────────────────────────┘
                                   │
                                   ▼
┌─────────────────────────────────────────────────────────────────────┐
│  Display in polar coordinates, by an output device communicatively  │
│  coupled to the equipment controller, a graph representing          │
│  boundaries of the region of the allotted residual vectors          │
│                                 1104                                │
└─────────────────────────────────────────────────────────────────────┘
                                   │
                                   ▼
┌─────────────────────────────────────────────────────────────────────┐
│   Display in polar coordinates, by the output device, a point       │
│                  representing the residual vector                   │
│                                 1106                                │
└─────────────────────────────────────────────────────────────────────┘
```

FIG. 11

MODELING AND VISUALIZATION OF VIBRATION MECHANICS IN RESIDUAL SPACE

TECHNICAL FIELD

The disclosure relates to vibration analysis, and, more particularly, to modeling and visualization of vibration mechanics in residual space.

BACKGROUND

Changes in vibration mechanics may provide information concerning abnormalities and failures related to rotating equipment. Conventional methods for analyzing changes in vibrational data related to rotating equipment can be based on the first principle calculations and physics-based models. Even though conventional solutions may allow detecting failures in the rotating equipment as they occur, they sometimes fail to provide sufficiently early warnings for the failures.

One feature that may provide an early indication of a failure in rotating equipment is a slow roll vector. Conventional methods for capturing the slow roll vector sometimes use higher sampling rate data that may not be available.

SUMMARY OF THE DISCLOSURE

This disclosure relates to modeling and visualization of vibration mechanics in residual space. Certain embodiments of the disclosure relate to systems and methods of vibration analysis of rotating equipment. Certain embodiments of the disclosure can facilitate monitoring vibration mechanics of the rotating equipment and detecting abnormalities and failures related to the rotating equipment.

According to one embodiment of the disclosure, a system for vibration analysis is provided. The system may include rotating equipment operating in an operational mode. The system may also include at least one sensor configured to detect and provide vibrational data of the rotating equipment. The system may also include an equipment controller communicatively coupled to the at least one sensor. The equipment controller may be configured to determine at least one vibrational vector based on the vibrational data. The equipment controller can be configured to determine, based on a model, an expected vibrational vector for the operational mode. The equipment controller may be further configured to calculate a residual vector as a difference between the at least one vibrational vector and the expected vector. The equipment controller can be further configured to determine at least one abnormality associated with the rotating equipment based on the residual vector.

In some embodiments of the disclosure, the operational mode may have at least one of the following parameters: rotations per minute, a bearing metal temperature, a bearing oil inlet temperature, a bearing oil outlet temperature, and a load of the shaft.

In some embodiments of the disclosure, the vibrational vector may include at least one of the following: a 1× amplitude and a 1× phase, 2× amplitude and 2× phase, a ½× amplitude and ½× phase, an amplitude, and a phase based on a once per a revolution indication.

In some embodiments of the disclosure, the abnormality may include at least one of the following: a misalignment, a radial preload, a high synchronous vibration, a sub-synchronous rub, a rotor bow, and a whipping.

In some embodiments of the disclosure, the equipment controller may be further configured to translate the at least one vibrational vector into a real component and an imaginary component and translate the expected vibrational vector into an expected real component and an expected imaginary component. The equipment controller may be further configured to determine a residual real component as a difference between the real component and the expected real component and determine a residual imaginary component as a difference between the imaginary component and the expected imaginary component. The equipment controller may be further configured to translate the residual real component and the residual imaginary component into the residual vector.

In some embodiments of the disclosure, the model may include an empirical model, a physics based model, and a hybrid of the empirical model and the physics based model. In certain embodiments, the empirical model can be based on historical values of the vibrational vector. The historical values may be recorded while the rotating equipment operates without abnormalities.

In some embodiments of the disclosure, the historical values can include at least one of the following: a slow roll amplitude and a slow roll phase, a compensated amplitude and a compensated phase, a forward amplitude and a forward phase, and a reverse amplitude and a reverse phase.

In some embodiments of the disclosure, the equipment controller can be configured to record, during a shutdown time of the rotating equipment, at least one the following: a first graph for a speed of rotation of the rotating equipment, a second graph for an amplitude of a vibration of the rotating equipment, and a third graph for a phase of a vibration of the rotating equipment. The equipment controller may be further configured to fit the first graph with a first fractional time order decay, fit the second graph with a second fractional time order decay, and fit the third graph with a third fractional time order decay. The equipment controller can be configured to estimate the slow roll amplitude based on a correlation between the first fractional time order decay and the second fractional time order decay. The equipment controller may be further configured to estimate the slow roll phase based on a correlation between first fractional time order decay and the third fractional time order decay of the phase.

In some embodiments of the disclosure, the system can include an output device communicatively coupled to the equipment controller. The equipment controller may be further configured to determine, based on the empirical model, a region of allotted residual vectors for the operational mode. The equipment controller may display in polar coordinates, by the output device, a graph representing boundaries of the region of the allotted residual vectors and a point representing the residual vector.

In some embodiments of the disclosure, the equipment controller can be further configured to calculate, based on at the least one vibrational vector, an orbit precession, an ellipticity ratio, an orbit shape, a precession direction, and a high 1× synchronous ratio. The equipment controller may be further configured to calculate, based on the empirical model and the operational mode, a normalized region of planer orbits, a normalized region of highly elliptical orbits, and a normalized region of elliptical orbits. The equipment controller may be further configured to display, by the output device, at least one of the following: a projection of the orbit shape, the normalized region of planer orbits, the normalized region of highly elliptical orbits, and the normalized region of elliptical orbits. The equipment controller may be further configured to display, by the output device, a direction of a rotation of the rotating equipment and the precession direction.

According to another embodiment of the disclosure, a method for vibrational analysis is provided. A method may include acquiring, by at least one sensor, vibrational data and an operational mode of rotating equipment. The method may further allow determining, by an equipment controller communicatively coupled to the sensor, at least one vibrational vector based on the vibrational data. The method may also include determining, by the equipment controller and based on a model, an expected vibrational vector for the operational mode. The method may include calculating, by the equipment controller, a residual vector as a difference between the vibrational vector and the expected vector. The method may further allow determining, by the equipment controller, at least one abnormality associated with the rotating equipment based on the residual vector.

Other embodiments, systems, methods, features, and aspects will become apparent from the following description taken in conjunction with the following drawings.

BRIEF DESCRIPTION OF THE DRAWINGS

FIG. 8 shows polar plots of vibrational data of the rotating equipment, according to an example embodiment of the disclosure.

FIG. 9 shows polar plots of residual vibrational data, according to an example embodiment of the disclosure.

FIG. 11 is flow chart illustrating an example method for visualization of results of the vibration analysis, according to an example embodiment of the disclosure.

DETAILED DESCRIPTION

Certain embodiments of the disclosure can include systems and methods for vibration analysis of rotating equipment. The disclosed systems and methods may provide visual representation of vibrational data of the rotating equipment and facilitate issue of warnings for hardware failures of the rotating equipment.

In some example embodiments of the disclosure, a method for vibrational analysis may include acquiring, by at least one sensor, vibrational data and an operational mode of rotating equipment. The method may allow determining, by an equipment controller communicatively coupled to the sensor, at least one vibrational vector based on the vibrational data. The method may determine, by the equipment controller and based on a model, an expected vibrational vector for the operational mode. The method may calculate, by the equipment controller, a residual vector as a difference between the vibrational vector and the expected vector. The method may allow determining, by the equipment controller, at least one abnormality associated with the rotating equipment based on the residual vector.

Technical effects of certain embodiments of the disclosure may include performing a diagnostic of rotating equipment. Further technical effects of certain embodiments of the disclosure may facilitate a finer resolution of abnormality detection to enable early warnings of oncoming hardware failures related to the rotating equipment. Yet further technical effects of certain embodiments of the disclosure provide information concerning health of the rotating equipment and allow reducing unwanted shutdowns of rotating equipment, forced outage time, and unplanned costs.

The following provides a detailed description of various example embodiments related to systems and methods for vibration analysis.

Figure 1:
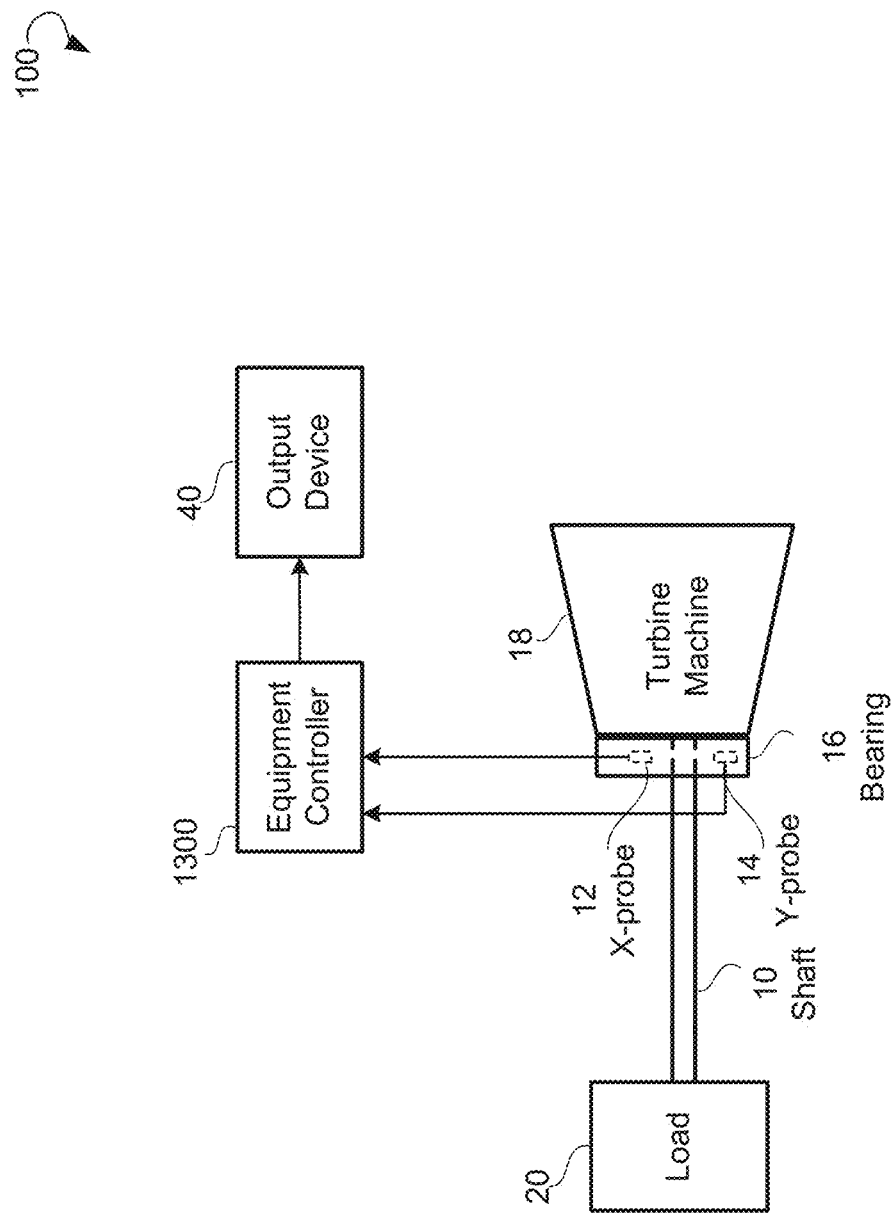
FIG. 1 is a block diagram illustrating an example system for vibration analysis, according to certain embodiments of the disclosure.

Turning now to the drawings, FIG. 1 is a block diagram illustrating an example rotating equipment system 100, in which methods for vibration analysis may be practiced, in accordance with certain embodiments of the disclosure. The system 100 may include a shaft 10, a bearing 16, an X-probe 12. Y-probe 14, an equipment controller 1300, and an output device 40. The system 100 may include a turbine machine 18 configured to rotate the shaft 10 along an axis of the system 100. The shaft 10 may be connected to a load 20, which may include a vehicle or a stationary load, such as a compressor, an electrical generator of a power plant, and so forth. The load 20 may include any suitable device capable of being powered by the rotating output of system 100.

In various embodiments, the rotating equipment may include any equipment that includes shaft supported by hydrodynamic or static bearing. The rotating equipment can be part of compressors, pumps, turbines, and so forth.

Figure 2:
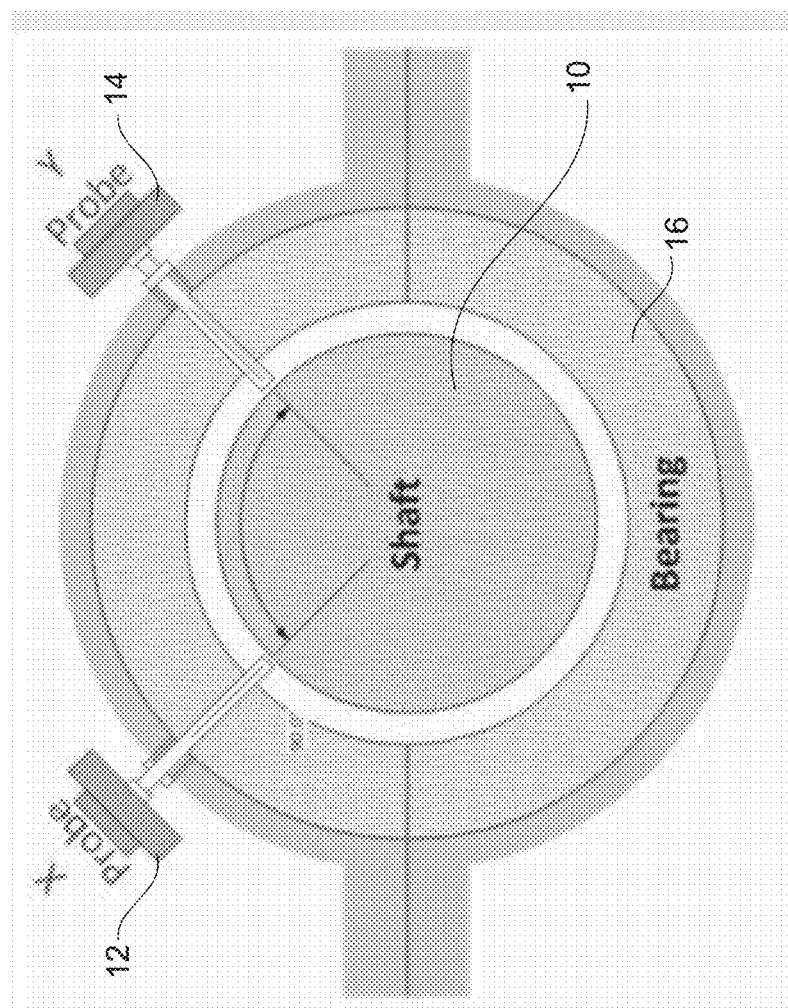
FIG. 2 is a block diagram illustrating a cross section of a shaft, a bearing, and probes, according to an embodiment of the disclosure.

FIG. 2 is a block diagram illustrating a cross section 200 of a bearing 16, a shaft 10, an X-probe 12, and a Y-probe 14, according to an embodiment of the disclosure. The X-probe 12 and Y-probe 14 are two proximity probes of the same or similar type mounted about 90 degrees apart on bearing 16 to measure motions of the shaft 10. As the shaft 10 rotates, a center of the shaft 10 may deviate from an axis of the rotation. X-probe 12 and Y-probe 14 may measure projections of the deviation in two orthogonal coordinates and provide the projections as vibrational data to the equipment controller 1300 for analysis. Other parameters provided to the equipment controller may include a speed of the shaft rotation (in rotations per minutes), a bearing metal temperature, a bearing oil inlet temperature, a bearing oil outfall temperature, a load of the shaft, and other parameters defining conditions under which the vibrational data were obtained.

In some embodiments of the disclosure, the vibration analysis may include determining, based on the vibrational data, one or more vibrational vectors. The one or more vibrational vectors may include an amplitude and a phase. In some embodiments, the vibrational vector may include 1× amplitude and 1× phase, 2× amplitude and 2× phase, and ½× amplitude and ½× phase. The vibration analysis may further include determining a compensated amplitude and a compensated phase, a forward amplitude and a forward phase, and a reverse amplitude and a reverse phase. The vibrational analysis may further include determining a direct current (DC) gap, a major 1× axis, a minor 1× axis, an orbit procession, an ellipticity ratio, an orbit shape, a high 1× synchronous ratio, a probe check, and a slow roll vector. In some embodiments, the one or more vibrational vectors can be determined based on a once per revolution indication measured with a keyphaser.

In some embodiments of the disclosure, the vibration analysis may further include determining an indication of a failure mode of rotating equipment, such as a misalignment, a radial preload, a high synchronous vibration, a sub-synchronous rub, a rotor bow, and a whipping.

In some embodiments of the disclosure, the indication of a failure mode of the rotating equipment may be estimated based on a comparison of the determined vibrational vector and a value of the vibrational vector expected for conditions at which vibrational data was obtained. In some embodiments, deviations of vibrational vectors from the expected vibrational vectors (referred herein to as residual vibrational vectors) can be analyzed to determine an indication of a failure in the rotating equipment. The residual vibrational vectors can form a residual space.

In certain embodiments of the disclosure, an expected vibrational vector can be determined based on a model. In some embodiments, the model may include a physics based model, an empirical model, and a hybrid of the physics based model and the empirical model. In some embodiments, the empirical model can be based on historical vibrational data. The historical vibrational data can be collected during an extended period (for example, a year) of operations of the rotating equipment. Data sets that are indicative of a failure mode can be removed from the historical data such that the remaining historical data (also referred to as sampled values) represent a normal behavior of the rotating equipment. Each entry in the historical vibrational data can be associated with an operational mode in which the rotating equipment is being operated. The operational mode can be characterized, for example, by a load on the shaft, a speed of rotation of the shaft, a gas pressure in a turbine driving the shaft, a bearing metal temperature, and so forth. In some embodiments, collection of the historical data continues until there is enough data collected to characterize a normal behavior of the rotating equipment in several operational modes.

In some embodiments of the disclosure, the empirical model may be used to determine expected values for vibrational data during a runtime of the rotating equipment. In some embodiments, the expected values are determined as a linear combination of the collected sampled values based on current values of a load, a speed of rotation, a gas pressure, a bearing metal temperature, and so forth. The expected values for the vibrational data can be further compared to actual values for the vibrational data measured with the X-probe and the Y-probe in real time. Deviation of a difference between actual values of the vibrational data (or vibrational vectors obtained using the vibrational data) and the expected values outside pre-determined boundaries may be indicative of a failure of the rotating equipment.

Figure 3:
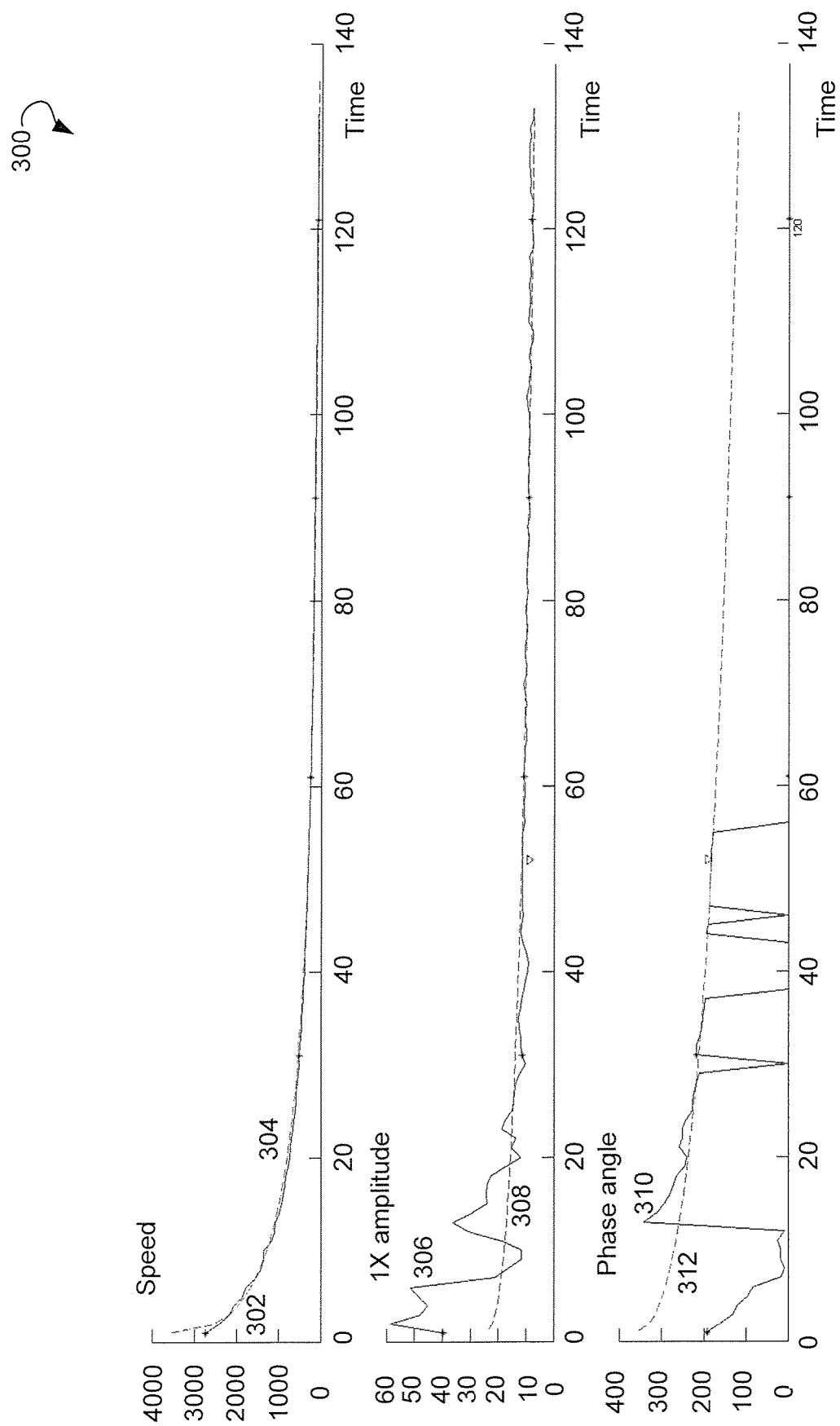
FIG. 3 show plots of a shutdown curve for speed, a shutdown curve for amplitude, and a shutdown curve for phase approximated using fractional time order decays, according to an example embodiment of the disclosure.

A slow row vector may provide information regarding a deformity in the shaft. The slow roll vector may have a large error if there is a limited window for measurements during a shutdown period. FIG. 3 shows an example shutdown curve 302 for a speed of rotation, a shutdown curve 306 for a 1× amplitude, and a shutdown curve 310 for a phase, according to an embodiment of the disclosure.

In certain embodiments of the disclosure, resonance peaks and oscillations in shutdown curves for an amplitude and a phase can be ignored. A shutdown curve for a speed, a shutdown curve for amplitude, and a shutdown curve for a phase can be approximated using a fractional time order decay. In example of FIG. 3, the shutdown curve 302 for the speed is approximated by the fractional time order decay 304, the shutdown curve 306 for the amplitude is approximated by the fractional time order decay 308, and the shutdown curve 310 for the speed is approximated by the fractional time order decay 312. In some embodiments of the disclosure, the shutdown curve for speed can be approximated by the following equation:

$$S(t) = S_{SS} e^{-\tau_s \sqrt{t}} \tag{1a}$$

wherein $S_{SS}$ is a steady state speed and $\tau_s$ is a speed decay constant.

The shutdown curve for amplitude can be approximated by the following equation:

$$M(t) = M_{SS} e^{-\tau_m \sqrt{t}} \tag{1b}$$

wherein $M_{SS}$ is a steady state amplitude and $\tau_m$ is an amplitude decay constant.

The shutdown curve for an amplitude can be approximated by the following equation:

$$P(t) = P_{SS} e^{-\tau_p \sqrt{t}} \tag{1c}$$

wherein $P_{SS}$ is a steady state phase and $\tau_p$ is a phase decay constant.

The fractional time order decay 304 for a speed and fractional time order decay 308 for an amplitude can be correlated during the shutdown. Similarly, the fractional time order decay 304 for a speed and fractional time order decay 312 for a phase can be correlated during the shutdown. Using the correlation, an amplitude and a phase of vibrational vector can be estimated for a point of time provided that the corresponding speed at that point of time is also known.

Usage of equations 1a, 1b, and 1c allows reducing the number of sampled points required for the estimation of a slow roll vector, since estimates of the amplitude and the phase in equations 1a, 1b, and 1c need, for instance, one valid sample point ($t_2$) along the shutdown curve.

Solving the equations 1a, 1b, and 1c results in the following formulas:

$$M_{SR} = M_{SS} e^{\frac{\log\left(\frac{M_2}{M_{SS}}\right)\log\left(\frac{S_{SR}}{S_{SS}}\right)}{\log\left(\frac{S_2}{S_{SS}}\right)}} \tag{2a}$$

$$P_{SR} = P_{SS} e^{\frac{\log\left(\frac{P_2}{PM_{SS}}\right)\log\left(\frac{S_{SR}}{S_{SS}}\right)}{\log\left(\frac{S_2}{S_{SS}}\right)}} \tag{2b}$$

wherein $M_{SR}$ is a slow roll amplitude, $P_{SR}$ is a slow roll phase, $S_{SR}$ is a slow roll speed, $M_2$ is an amplitude at a sampled point. $P_2$ is a phase at a sampled point $t_2$, and $S_2$ is speed at a sampled point $t_2$.

Figure 4:
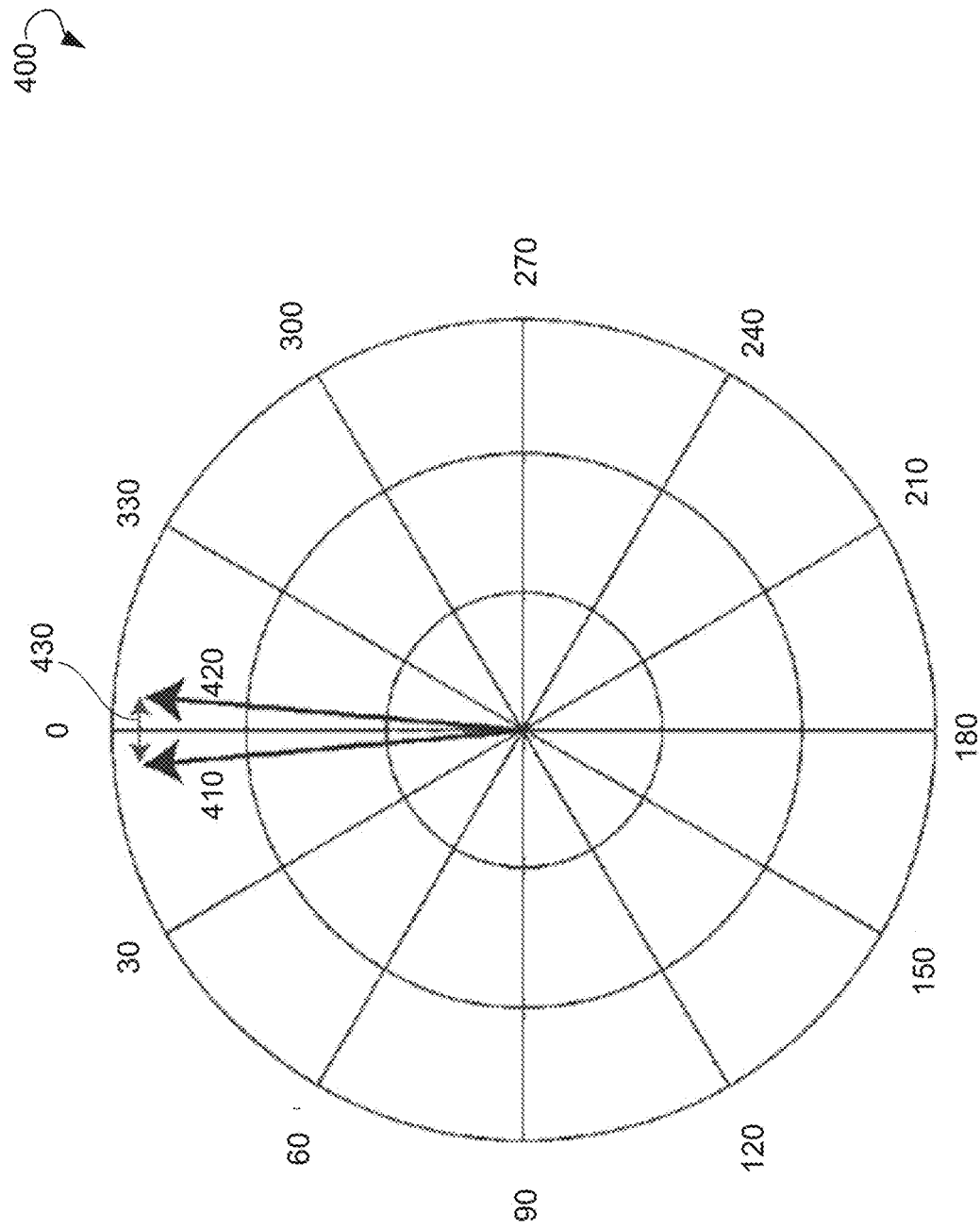
FIG. 4 is a polar plot showing a change in an example vibrational vector at 0/360 degree border, according to an example embodiment of the disclosure.

FIG. 4 is a polar plot showing an example vibrational vector 410 and example vibrational vector 420, according to an embodiment of the disclosure. An actual difference 430 between the phase of vibrational vector 410 and the phase of the vibrational vector 420 is about 5 degrees, while a numerical difference between the phase of vibrational vector 410 and the phase of the vibrational vector 420 is about 355 degrees. FIG. 4 shows an example of a phase discontinuity at 0/360 border, when a small change in the phase of the vibrational vector may result in a large numerical change of the phase. The phase discontinuity may lead to false alarms when an actual vibrational vector is compared to an expected vibrational vector determined with an empirical model. The phase discontinuity may lead to numerical errors when generating an empirical model based on collected historical vibrational data.

In some embodiments of the disclosure, prior to the comparison, an actual vibrational vector and an expected vibrational vector are translated from polar coordinates into rectangular coordinates. In certain embodiments, translation of a vibrational vector into rectangular coordinates includes translation of an amplitude and a phase of the vector into real and imaginary components. The translated actual vibrational vector and the translated expected vibrational vector may be then used to determine a residual vector in rectangular coordinates. The residual vector may be translated back to polar coordinates (an amplitude and a phase), thereby allowing for an intuitive visual interpretation of the residual vector.

Figure 5:
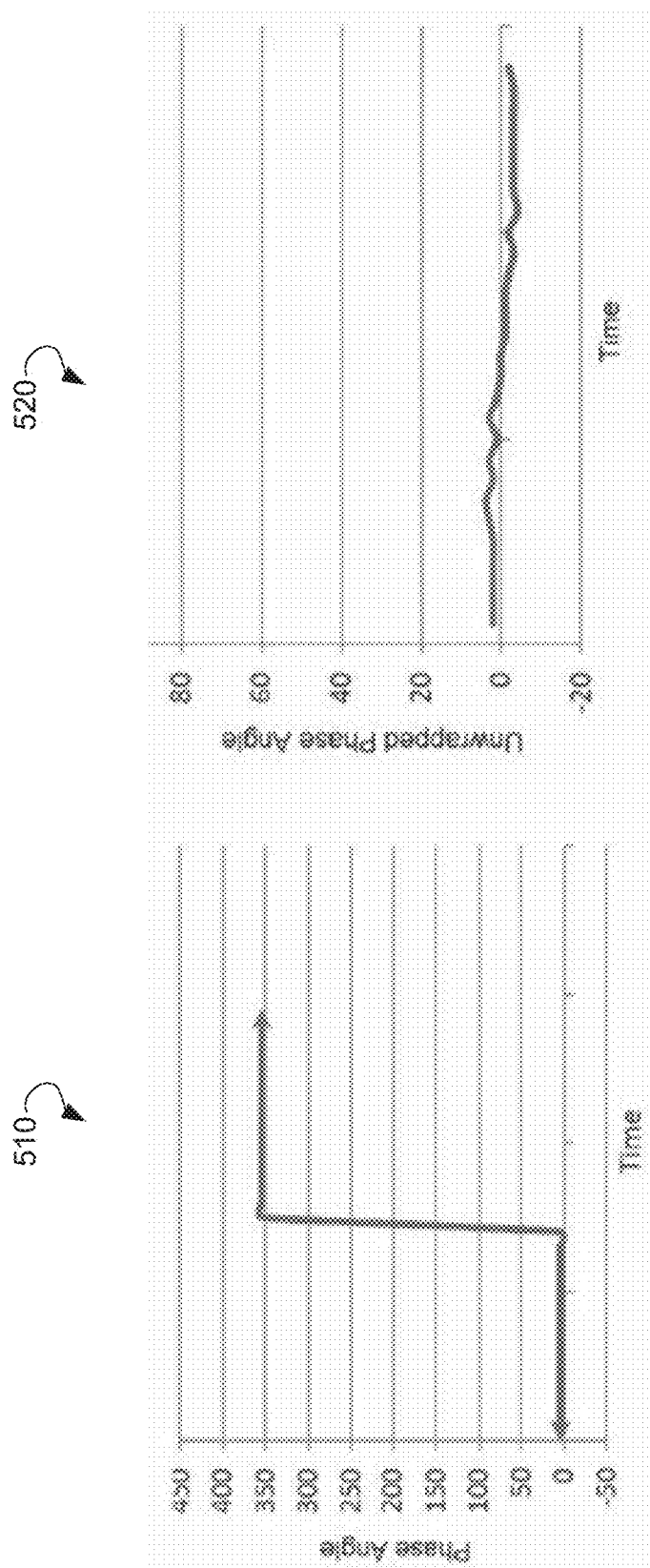
FIG. 5 shows example plots of a phase angle as a vibrational vector moves through a 0/360 degree border, according to an example embodiment of the disclosure.

FIG. 5 shows plots 510 and 520 of a change in a phase angle of an example vibrational vector as it moves through a 0/360 border, according to an embodiment of the disclosure. The plot 510 shows the change in the phase angle, when the change is determined in polar coordinates. Even though the vibrational vector moves by only about 10 degrees, the numerical changes amount to about 350 degrees. The plot 520 shows the change in the phase angle, when the change is determined in rectangular coordinates and translated back to the polar coordinates. The phase shifts from slightly above the zero values to slightly below zero values.

Figure 6:
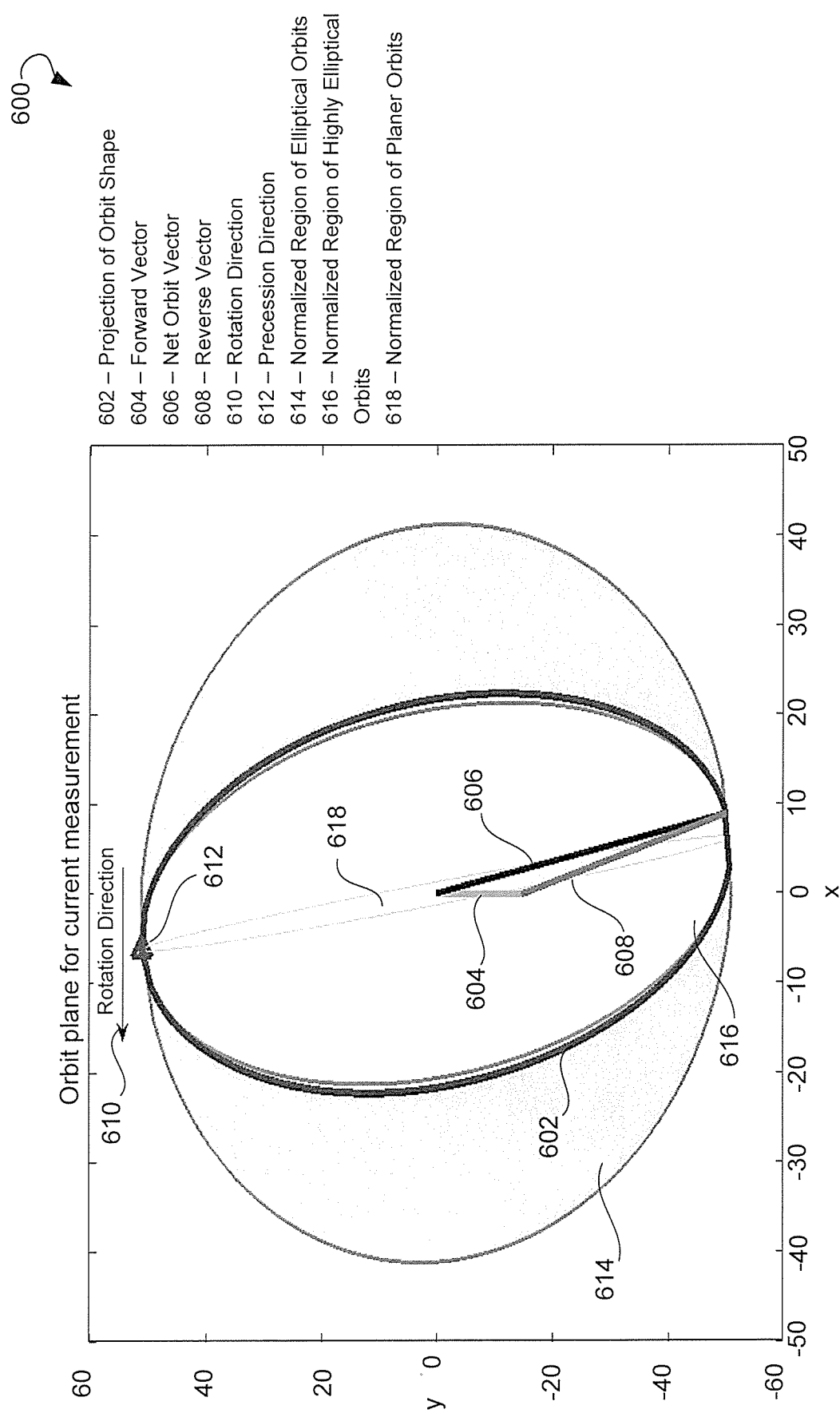
FIG. 6 is an example plot of a visualization of vibrational data of rotating equipment, according to an example embodiment of the disclosure.

FIG. 6 is an example plot 600 showing visualization of vibration data of rotating equipment, according to an embodiment of the disclosure. The plot 600 can include a projected orbit shape 602, a forward vector 604, a net orbit vector 606, and a reverse vector 608. The plot 600 may also include an indication 610 of a direction of rotation of a shaft and precession direction 612. The plot 600 may also include a normalized region 614 of elliptical orbits, a normalized region 616 of highly elliptical orbits, and a normalized region of planer orbits 618, which may be indicative of the equipment experiencing a "whipping" failure. The projected orbit shape 602, the forward vector 604, the net orbit vector 606, and the reverse vector 608 can be determined based on vibrational data at a point of time the measurements are taken.

When the projected orbit shape 602 is within the normalized region 614 of elliptical orbits, a shape of the orbit is either elliptical or circular, which indicates a normal behavior of the rotating equipment. When the projected orbit shape 602 is moving out of normalized region 614 of elliptical orbits and towards to the normalized region 616 of highly elliptical orbits and further to the planer orbits region 618, it may be indicative of a failure of the rotating equipment, such as whipping. When precession direction 612 is opposite to rotation direction 610, it may be indicative of the rotating equipment experiencing a "rub" failure.

Figure 7:
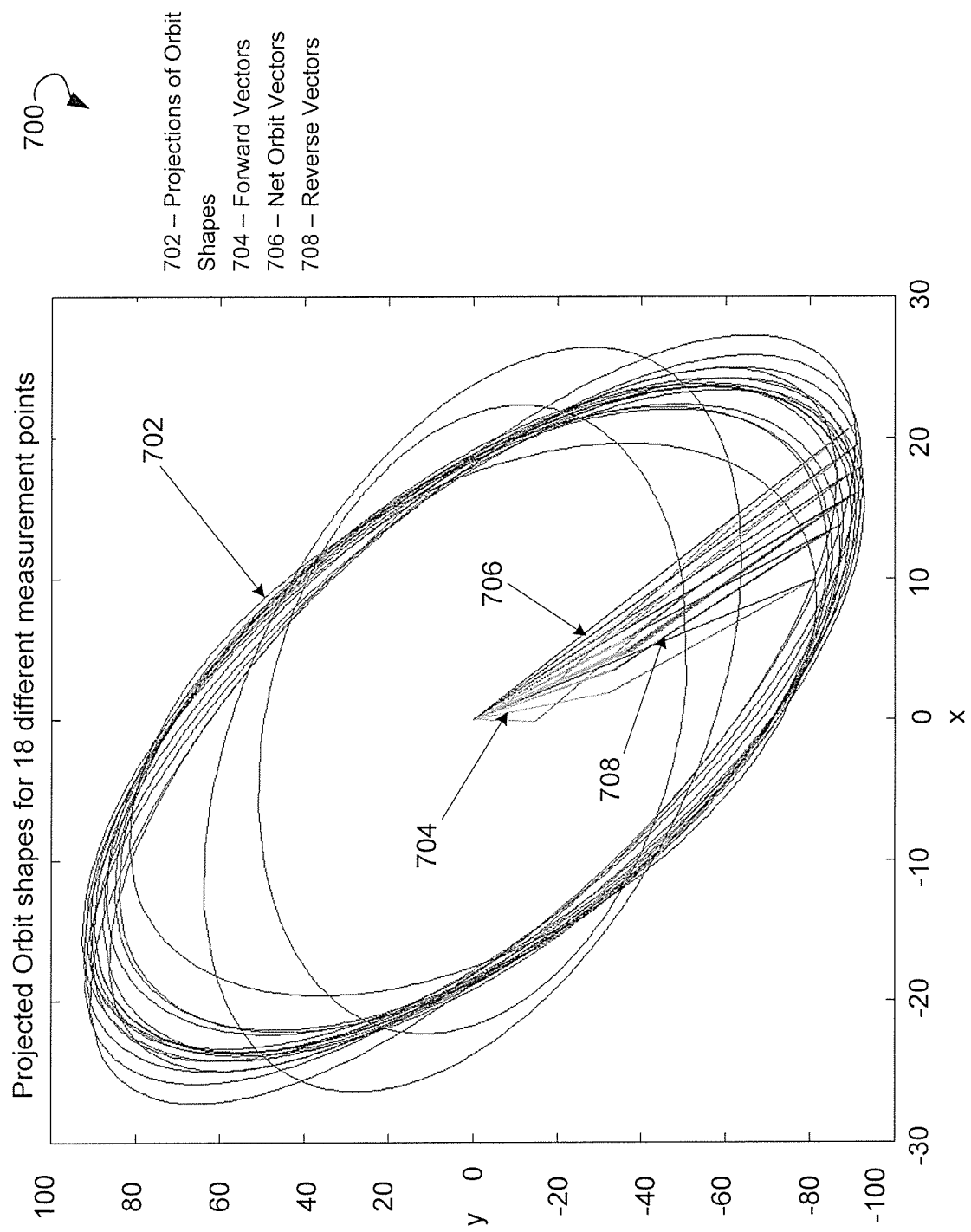
FIG. 7 is an example plot showing progression of vibrational data of rotating equipment, according to an example embodiment of the disclosure.

FIG. 7 is an example plot 700 showing progression of vibrational data of the rotating equipment, according to an embodiment of the disclosure. The plot 700 can include projected orbit shapes 702, forward vectors 704, net orbit vectors 706, and reverse vectors 708 determined based on vibrational data measured at several time points.

FIG. 8 shows example polar plots 810 and 820 of vibrational data of rotating equipment, according to an embodiment of the disclosure. The plot 810 can represent measured Y-probe data 815 and corresponding estimated Y-probe data 825. The plot 820 represents measured X-probe data 830 and corresponding estimated X-probe data 840. X-probe data 840 and Y-probe data 825 can be estimated using a model based on current operational parameters of the rotating equipment. When both measured Y-probe data 815 and estimated Y-probe data 825 are within a close proximity of each other and measured X-probe data 830 and estimated X-probe data 840 are within a close proximity of each other, it can be indicative of a normal behavior of the rotating equipment. When the measured data deviate from the estimated data significantly, it may be indicative of a failure mode of the rotating equipment.

FIG. 9 shows example polar plots 910 and 920 of residual vibrational data of rotating equipment, according to an embodiment of the disclosure. Plot 910 can include residual Y-probe data 915. The residual Y-probe data 915 can be determined as a difference between a measured Y-probe data 815 and an estimated Y-probe data 825. The plot 910 may include a butterfly shaped region 925. The curved edges of the butterfly shaped region 925 can bound the allotted amount of a deviation of a vibration amplitude of measured Y-probe data from a vibrational amplitude estimated based on a model. The radial traces connecting the edges and the origin can bound the allotted amount of a deviation in a vibration phase of measured Y-probe data from vibrational phase estimated based on the model.

Similarly, the plot 920 can includes residual X-probe data 930. The residual X-probe data 930 can be found as a difference between measured X-probe data 830 and estimated X-probe data 840. The plot 920 can include a butterfly shaped region 940. Any residual X-probe data outside the boundaries of butterfly shaped region 940 or Y-probe data outside the boundaries of butterfly shaped region 925 may be indicative of an abnormal behavior of the rotating equipment. It should be understood that similar plots can be provided for any vibrational vectors determined based on vibrational data of the rotating equipment allowing a user to visually determine an indication of a failure in the rotating equipment.

Figure 10:
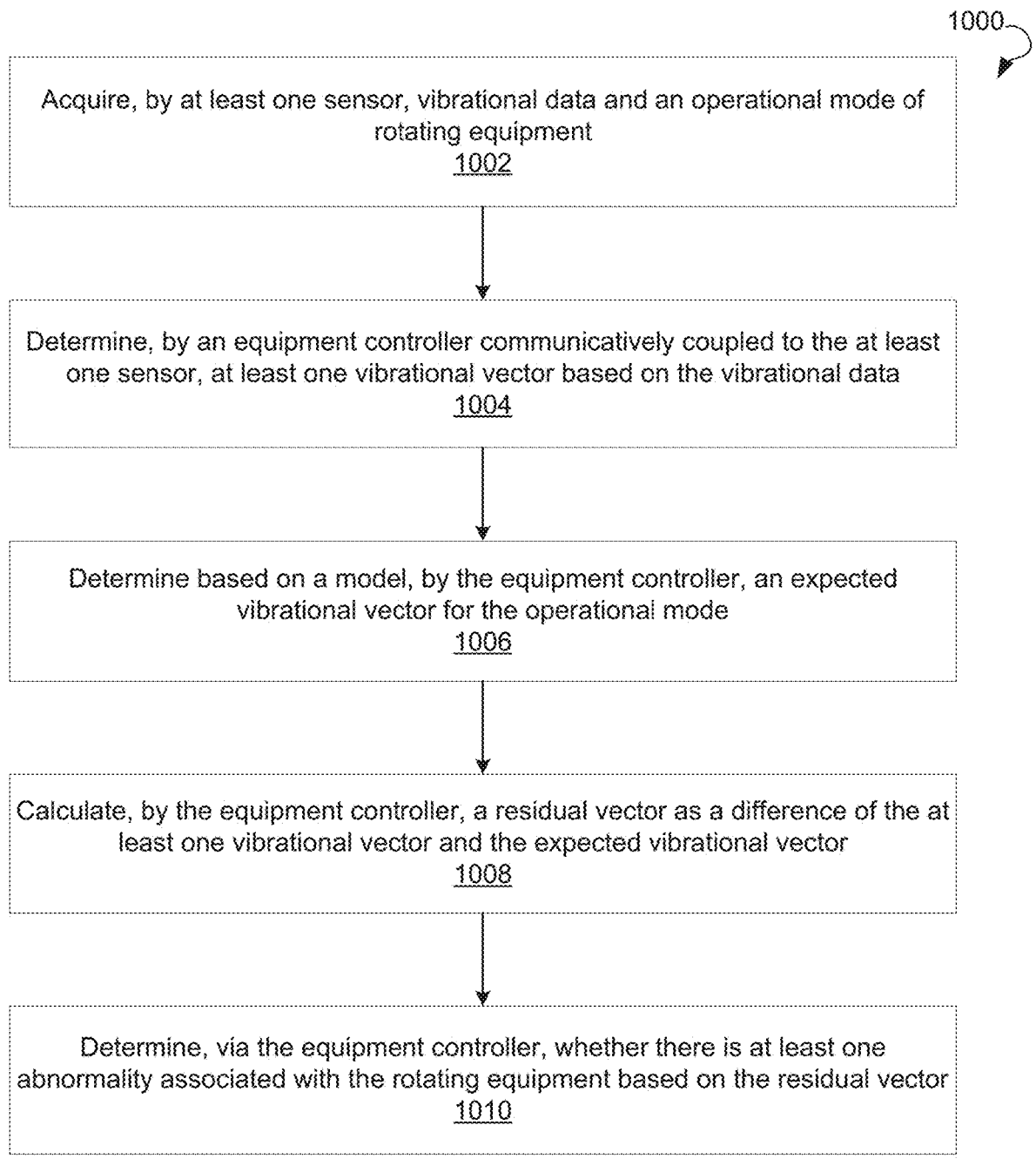
FIG. 10 is flow chart illustrating an example method for vibration analysis, according to an embodiment of the disclosure.

FIG. 10 is flow chart illustrating an example method 1000 for vibrational analysis, according to an example embodiment of the disclosure. The operations of the method 1000 can be performed by the rotating equipment system 100 described above with reference to FIG. 1.

Method 1000 can commence in block 1002, with acquiring, by at least one sensor (for example, X-probe 12 and/or Y-probe 14), vibrational data and an operational mode of rotating equipment. In block 1004, method 1000 may proceed with determining, by an equipment controller 1300 communicatively coupled to the sensor, at least one vibrational vector based on the vibrational data. In block 1006, method 1000 may determine, by the equipment controller 1300 and based on a model, an expected vibrational vector for the operational mode. In block 1008, method 1000 can calculate, by the equipment controller 1300, a residual vector as a difference between the vibrational vector and the expected vector. In block 1010, method may determine, by the equipment controller 1300, at least one abnormality associated with the rotating equipment based on the residual vector.

FIG. 11 is flow chart illustrating an example method 1100 for visualization of vibrational data, according to an example embodiment of the disclosure. The operations of method 1100 can be performed by the rotating equipment system 100 described above with reference to FIG. 1. Method 1100 may be a continuation of method 1000 described above with reference to FIG. 10.

Method 1100 can commence in block 1102, with determining, by the equipment controller 1300 and based on the model, a region of allotted residual vectors for the operational mode of the rotating equipment. In block 1104, method 1100 may proceed with displaying in polar coordinates, by the equipment controller 1300 on an output device 40 communicatively coupled to the equipment controller, a graph representing boundaries of the region of the allotted residual vectors. In block 1106, method 1100 may display, in polar coordinates by the equipment controller 1300 on an output device 40 communicatively coupled to the equipment controller, a point representing the residual vector.

Figure 12:
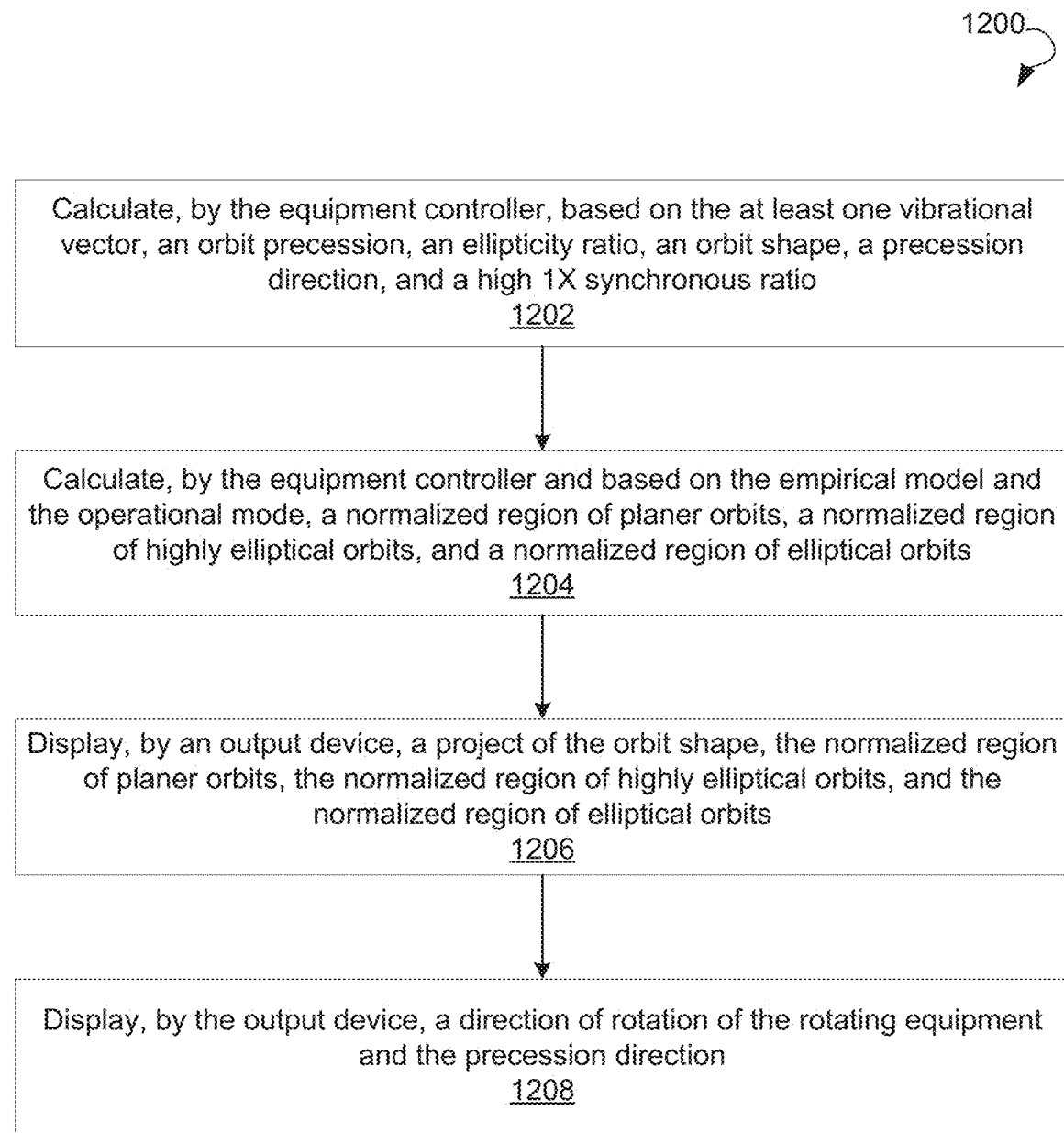
FIG. 12 is flow chart illustrating an example method for visualization of orbits, according to an example embodiment of the disclosure.

FIG. 12 is flow chart illustrating an example method 1200 for visualization of vibrational data, according to an example embodiment of the disclosure. The operations of the method 1200 can be performed by the rotating equipment system 100 described above with reference to FIG. 1. Method 1200 may be a continuation of method 1000 described above with reference to FIG. 10.

Method 1200 may commence in block 1202, with calculating, by the equipment controller 1300 and based on the at least one vibrational vector, an orbit precession, an ellipticity ratio, an orbit shape, a precession direction, and a high 1× synchronous ratio.

In block 1204, method 1200 may proceed with calculating, by the equipment controller 1300 and based on the empirical model and the operational mode of the rotating equipment, a normalized region of planer orbits, a normalized region of highly elliptical orbits, and a normalized region of elliptical orbits.

In block 1206, method 1200 may display, by the equipment controller 1300, on the output device 40 some or all of the following: a projection of the orbit shape, the normalized region of planer orbits, the normalized region of highly elliptical orbits, and the normalized region of elliptical orbit to show a type of the orbit shape.

In block 1208, method 1200 may display, by the equipment controller 1300 on the output device 40, a direction of a rotation, and a precession direction.

Figure 13:
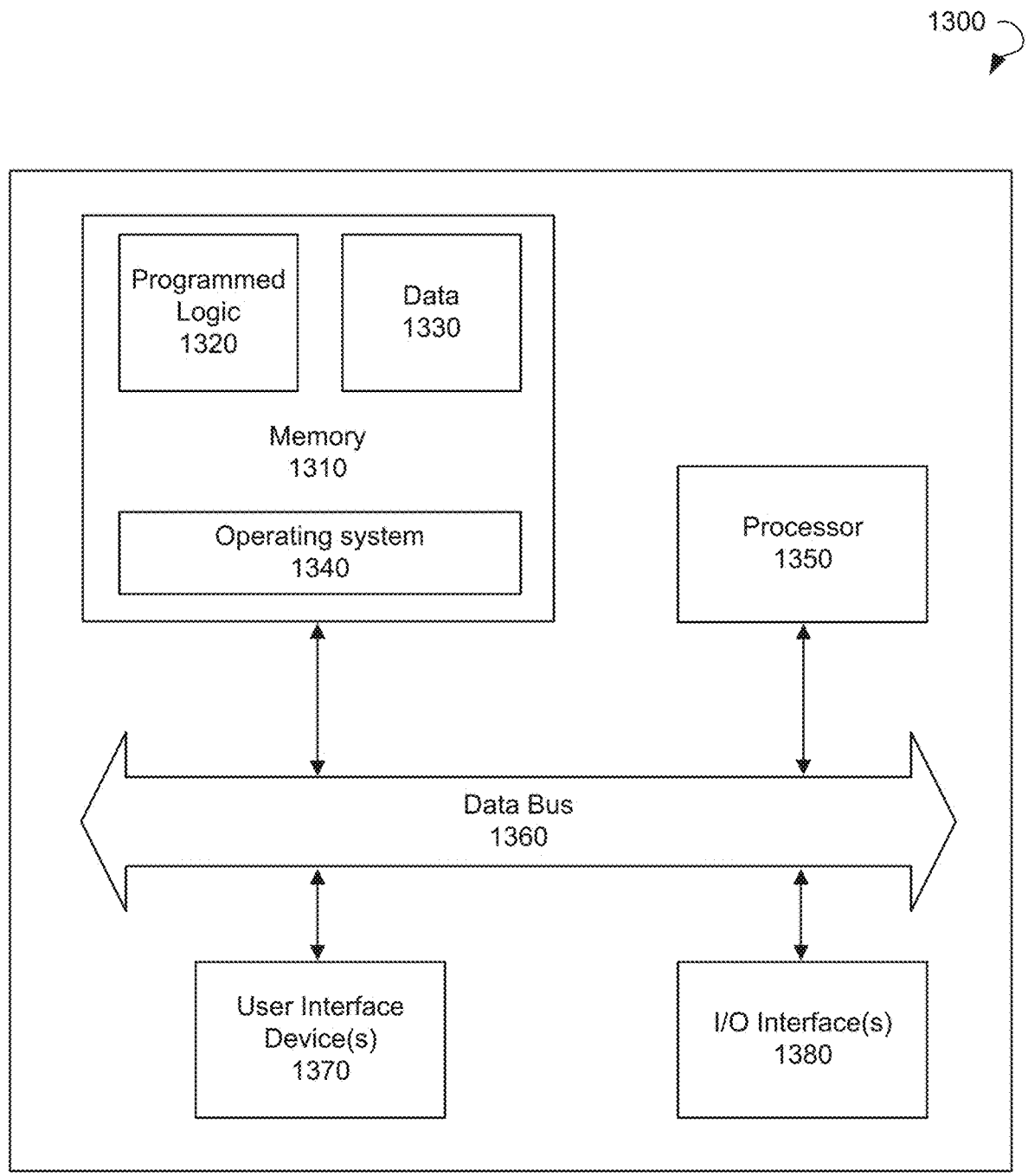
FIG. 13 is a block diagram illustrating an example controller for controlling a combustion fuel system, in accordance with an embodiment of the disclosure.

FIG. 13 depicts a block diagram illustrating an example controller 1300, in accordance with an embodiment of the disclosure. More specifically, the elements of the controller 1300 may be used to analyze vibrational data of rotating equipment. The controller 1300 may include a memory 1310 that stores programmed logic 1320 (e.g., software) and may store data 1330, such as operational data associated with the combustion fuel system, the set of constants, and the like. The memory 1310 also may include an operating system 1340.

A processor 1350 may utilize the operating system 1340 to execute the programmed logic 1320, and in doing so, may also utilize the data 1330. A data bus 1060 may provide communication between the memory 1310 and the processor 1350. Users may interface with the controller 1300 via at least one user interface device 1370, such as a keyboard, mouse, control panel, or any other device capable of communicating data to and from the controller 1300. The controller 1000 may be in communication with the rotating equipment system 100 while operating, via an input/output (I/O) interface 1080. Additionally, it should be appreciated that other external devices or other rotating equipment may be in communication with the controller 1000 via the I/O interface 1080. In the illustrated embodiment of the disclosure, the controller 1300 may be located remotely with respect to the rotating equipment system 100; however, it may be co-located or even integrated with the rotating equipment system 100. Further, the controller 1300 and the programmed logic 1020 implemented thereby may include software, hardware, firmware, or any combination thereof. It should also be appreciated that multiple controllers 1300 may be used, whereby different features described herein may be executed on one or more different controllers 1300.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operations and/or acts to be performed on the computer or other programmable apparatus to produce a computer implemented process such that the instructions that execute on the computer or other programmable apparatus provide operations and/or actions for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

The above detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The above detailed description is, therefore, not to be taken in a limiting sense, and the scope is defined by the appended claims and their equivalents.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for vibration analysis, the system comprising:
   a rotating equipment operating in an operational mode;
   an X-probe mounted on the rotating equipment to detect and provide X-probe vibrational data;
   a Y-probe mounted orthogonally from the X-probe on the rotating equipment to detect and provide Y-probe vibrational data;
   an equipment controller communicatively coupled to the at least one sensor, the equipment controller being configured to:
      determine at least one vibrational vector based on the X-probe vibrational data and the Y-probe vibrational data;
      determine an expected vibrational vector for the operational mode, wherein the equipment controller uses a model to:
         fit a first fractional time order decay to a graph for a speed of rotation of the rotating equipment recorded during a shutdown time,
         fit a second fractional time order decay to a graph for an amplitude of vibration of the rotating equipment recorded during the shutdown time,
         fit a third fractional time order decay to a graph for a phase of vibration of the rotating equipment recorded during the shutdown time,
         estimate an expected amplitude and an expected phase based on a correlation between the first, second, and third fractional time order decays, and
         determine the expected vibrational vector based on the expected amplitude and expected phase,
      translate the at least one vibrational vector and the expected vibrational vector from polar coordinates to rectangular coordinates;
      calculate a residual vector as a difference between the at least one vibrational vector and the expected vector;
      translate the residual vector from rectangular coordinates to polar coordinates;
      determine at least one abnormality associated with the rotating equipment based on the residual vector; and
      output, via a display device, the residual vector including an amplitude and a phase to visually indicate the at least one abnormality.

2. The system of claim 1, wherein the operational mode has at least one of the following parameters: rotations per minute, a bearing metal temperature, a bearing oil inlet temperature, a bearing oil outlet temperature, and a load of the shaft.

3. The system of claim 1, wherein the at least one vibrational vector includes at least one of the following: a 1× amplitude and a 1× phase, a 2× amplitude and a 2× phase, a ½X amplitude and ½X phase, and an amplitude and a phase based on a once per a revolution indication.

4. The system of claim 1, wherein the at least one abnormality includes at least one of the following: a misalignment, a radial preload, a high synchronous vibration, a sub-synchronous rub, a rotor bow, and a whipping.

5. The system of claim 1, wherein the equipment controller is configured to:
   translate the at least one vibrational vector into a real component and an imaginary component;
   translate the expected vibrational vector into an expected real component and an expected imaginary component;
   determine a residual real component as difference between the real component and the expected real component;
   determine a residual imaginary component as difference between the imaginary component and the expected imaginary component; and
   translate the residual real component and the residual imaginary component into the residual vector.

6. The system of claim 1, wherein the model is one of the following: an empirical model, a physics based model, and a hybrid of the empirical model and the physics based model, and wherein the empirical model is based on historical values of the at least one vibrational vector, the historical values being recorded while the rotating equipment operates without the at least one abnormality.

7. The system of claim 6, wherein the historical values include at least one of the following: a slow roll amplitude and a slow roll phase, a compensated amplitude and a compensated phase, a forward amplitude and a forward phase, and a reverse amplitude and a reverse phase.

8. The system of claim 1, further comprising an output device communicatively coupled to the equipment controller, wherein the equipment controller is further configured to:
   determine, based on the empirical model, a region of allotted residual vectors for the operational mode; and
   display, by the output device, in polar coordinates:
      a graph representing boundaries of the region of the allotted residual vectors; and
      a point representing the residual vector.

9. The system of claim 1, further comprising an output device communicatively coupled to the equipment controller, wherein the equipment controller is further configured to:
   calculate, based on at the least one vibrational vector, an orbit precession, an ellipticity ratio, an orbit shape, a precession direction, and a high 1× synchronous ratio;
   calculate, based on the empirical model and the operational mode, a normalized region of planer orbits, a normalized region of highly elliptical orbits, and a normalized region of elliptical orbits;
   display, by the output device, at least one of the following:
      a projection of the orbit shape, the normalized region of planer orbits, the normalized region of highly elliptical orbits, and the normalized region of elliptical orbits; and display, by the output device, a direction of rotation of the rotating equipment and the precession direction.

10. A method for vibration analysis, the method comprising:
acquiring, by an X-probe mounted on the rotating equipment and a Y-probe mounted orthogonally from the X-probe on the rotating equipment, vibrational data and an operational mode of a rotating equipment;
determining, by an equipment controller communicatively coupled to the at least one sensor, at least one vibrational vector based on the vibrational data;
determining, by the equipment controller, an expected vibrational vector for the operational mode, wherein determining the expected vibrational vector further comprises using a model to perform the steps of:
fitting a first fractional order decay to a graph for a speed of rotation of the rotating equipment recorded during a shutdown time,
fitting a second fractional time order decay to a graph for an amplitude of vibration of the rotating equipment recorded during the shutdown time,
fitting a third fractional time order decay to a graph for a phase of vibration of the rotating equipment recorded during the shutdown time,
estimating an expected amplitude and an expected phase based on a correlation between the first, second, and third fractional time order decays, and
determining the expected vibrational vector based on the expected amplitude and expected phase;
translating the at least one vibrational vector and the expected vibrational vector from polar coordinates to rectangular coordinates;
calculating, by the equipment controller, a residual vector as a difference between the at least one vibrational vector and the expected vector;
translating the residual vector from rectangular coordinates to polar coordinates;
determining, by the equipment controller, at least one abnormality associated with the rotating equipment based on the residual vector; and
outputting, via a display device, the residual vector including an amplitude and a phase to visually indicate the at least one abnormality.

11. The method of claim 10, wherein the operational mode is associated with at least one of the following: rotations per minute, a bearing metal temperature, a bearing oil inlet temperature, a bearing oil outlet temperature, and a load.

12. The method of claim 10, wherein the at least one vibration vector includes at least one of the following: a 1× amplitude and a 1× phase, a 2× amplitude and a 2× phase, and a ½× amplitude and ½× phase, an amplitude and a phase based on a once per a revolution indication.

13. The method of claim 10, wherein the at least one abnormality includes at least one of the following: a misalignment, a radial preload, a high synchronous vibration, a sub-synchronous rub, a rotor bow, and a whipping.

14. The method of claim 10, wherein the calculating the residual vector includes:
translating, by the equipment controller, the at least one vibrational vector into a real component and an imaginary component;
translating, by the equipment controller, the expected vibrational vector into an expected real component and an expected imaginary component;
determining, by the equipment controller, a residual real component as a difference between the real component and the expected real component;
determining, by the equipment controller, a residual imaginary component as a difference between the imaginary component and the expected imaginary component; and
translating, by the equipment controller, the residual real component and the residual imaginary component into the residual vector.

15. The method of claim 10, wherein the model is one of an empirical model, a physics based model, and a hybrid of the empirical model and the physics based model, and wherein the empirical model is based on historical values of the at least one vibrational vector, the historical values being recorded while the rotating equipment operates without the at least one abnormality.

16. The method of claim 15, wherein the historical values include at least one of the following: a slow roll amplitude and a slow roll phase, a compensated amplitude and a compensated phase, a forward amplitude and a forward phase, and a reverse amplitude and a reverse phase.

17. The method of claim 10, further comprising:
determining, by the equipment controller and based on the empirical model and the operational mode, a region of allotted residual vectors for the operational mode;
displaying in polar coordinates, by the equipment controller on an output device communicatively coupled to the equipment controller:
a graph representing boundaries of the region of the allotted residual vectors; and
a point representing the residual vector;
calculating, by the equipment controller and based on the at least one vibrational vector, an orbit precession, an ellipticity ratio, an orbit shape, a precession direction, and a high 1× synchronous ratio;
calculating, by the equipment controller and based on the empirical model and the operational mode, a normalized region of planer orbits, a normalized region of highly elliptical orbits, and normalized region of elliptical orbits; and
displaying, by the equipment controller, on the output device some or all of the following: a projection of the orbit shape, the normalized region of planer orbits, the normalized region of highly elliptical orbits, and the normalized region of an elliptical orbit to show a type of the orbit shape, a direction of rotation, and the precession direction.

18. A system for vibration analysis, the system comprising:
a rotating equipment running in an operational mode, wherein the operational mode includes at least one of the following: rotations per minute, a bearing metal temperature, a bearing oil inlet temperature, a bearing oil outlet temperature, and a load;
an X-probe mounted on the rotating equipment to detect and provide X-probe vibrational data;
a Y-probe mounted orthogonally from the X-probe on the rotating equipment to detect and provide Y-probe vibrational data;
an output device to display graphics;
an equipment controller communicatively coupled to the at least one sensor and the output device, the equipment controller being configured to:
determine at least one vibrational vector based on the X-probe vibrational data and the Y-probe vibrational data, wherein the at least one vibration vector includes at least one of the following: a 1× amplitude and a 1× phase, a 2× amplitude and a 2× phase, a ½× amplitude and ½× phase, and an amplitude and a phase based on a once per a revolution indication;

determine, based on an empirical model, an expected vibrational vector for the operational mode, wherein the empirical model is generated based on historical values of the at least one vibrational vector, the historical values being recorded during operations of the rotating equipment without an abnormality associated with the rotating equipment and being fitted to a plurality of fractional time order decays, wherein the abnormality includes at least one of the following: a misalignment, a radial preload, a high synchronous vibration, a sub-synchronous rub, a rotor bow, and a whipping, and wherein a correlation between the plurality of fractional time order decays corresponds to the expected vibrational vector;

translate the at least one vibrational vector and the expected vibrational vector from polar coordinates to rectangular coordinates;

calculate a residual vector as a difference between the at least one vibrational vector and the expected vector;

translate the residual vector from rectangular coordinates to polar coordinates;

determine, based on the empirical model, a region of allotted residual vectors for the operational mode; and display, by the output device, in polar coordinates:
    a graph representing boundaries of the region of the allotted residual vectors; and
    a point representing the residual vector to determine, based on the residual vector, whether there is an abnormality associated with the rotating equipment.

\* \* \* \* \*